United States Patent [19]
Leiber et al.

[11] Patent Number: 5,574,343
[45] Date of Patent: Nov. 12, 1996

[54] CONTROL OF ACTIVATORS IN MOTOR VEHICLE DOORS

[75] Inventors: Heinz Leiber, Oberriexingen; Thomas Hennig, Frankfurt-Sossenheim; Dieter Busch, Rosbach, all of Germany

[73] Assignees: VDO Adolf Schindling AG, Frankfurt; Mercedes-Benz AG, Stuttgart, both of Germany

[21] Appl. No.: 283,400

[22] Filed: Jul. 29, 1994

Related U.S. Application Data

[63] Continuation-in-part of Ser. No. 161,284, Dec. 2, 1993.

[30] Foreign Application Priority Data

Dec. 2, 1992 [DE] Germany .......................... 42 40 403.7

[51] Int. Cl.⁶ ...................................................... H02P 1/58
[52] U.S. Cl. ...................... 318/291; 318/293; 318/474; 318/478; 318/453
[58] Field of Search ..................................... 318/474, 478, 318/479, 453, 454, 280, 291, 293

[56] References Cited

U.S. PATENT DOCUMENTS 3,594,584  7/1971  Woods .......................... 307/3

FOREIGN PATENT DOCUMENTS 3734449  4/1988  Germany .
4240403  3/1994  Germany .

*Primary Examiner*—Brian Sirius
*Attorney, Agent, or Firm*—Martin A. Farber

[57] ABSTRACT

A system for controlling actuating members in the doors of motor vehicles has at least one electromotive actuating drive and at least one actuating element (switch, button) in the door of the motor vehicle, as well as a control unit located in the vehicle itself. The system employs only a two-wire connection between control unit and actuating drive. The control unit, in addition to an ordinary pole-reversing and evaluation circuit, furthermore contains a source of alternating voltage as well as means for connecting the alternating voltage and a decoder. At least two passive components (resistor, capacitor, coil) of different size are provided to be connected by the actuating element in parallel with the actuating drive into the two-wire connection.

8 Claims, 4 Drawing Sheets

CONTROL OF ACTIVATORS IN MOTOR VEHICLE DOORS

RELATED APPLICATION

This application is a continuation-in-part of our copending application Ser. No. 08/161,284 filed Dec. 2, 1993.

FIELD AND BACKGROUND OF THE INVENTION

The present invention refers to a system for controlling actuators in motor vehicle doors using passive components (resistor, capacitor, coil) in order to produce the control commands for operating a device as a window, and wherein at least one electromotive actuating drive and at least one actuating element (switch, button) are located in the door of the vehicle and a control unit is located in the vehicle itself.

Doors of automotive vehicles can have electromotive actuating drives for the central locking and antitheft securing of the door lock, for the raising and lowering of the windows, and for the displacement of the outside mirror. The corresponding actuating elements are also customarily arranged in the door. These include switches and buttons for the displacement of the windows and outside mirror, as well as lock switches to be operated by the car key. The controlling of the electromotive actuating drives is effected via a central control unit within the vehicle. For this purpose, the control commands given via the actuating elements must be evaluated in the control unit and converted into control commands for the actuator drives.

For this purpose, in addition to the generally two-pole connection between actuator unit and actuating drive it is also necessary to lay the corresponding control lines, this being considered to be too expensive and subject to disturbance.

In order to reduce the expense for the wiring of standard devices, it has already been proposed to transmit the switch signals via bus or multiplex circuits, for which fewer lines are necessary. However, special control devices must be provided in the vehicle doors and they must be connected to the actuating elements so that in this case a true saving is obtained only in connection with the wiring within the vehicle and within the transition region between vehicle and door.

In order to reduce the expense for connecting elements, Federal Republic of Germany OS 37 34 449 proposes a device of the aforementioned type in which the control signals are produced in the manner that discrete points of a series connection of resistors acting as voltage divider are contacted by an actuating element. In this case, aside from the two-pole connection between the central control unit and the actuating drive, two control lines each between each of the actuating elements and the control unit are also required. For each operating unit consisting of actuating drive and actuating element, therefore, four connecting lines of the central control unit must still be laid.

SUMMARY OF THE INVENTION

The object of the present invention is substantially to reduce the expense for wiring as compared with the foregoing known arrangement, without reducing the number of functions. In a system of the foregoing type, according to the invention, only one two-pole connection is present between the control unit on the one hand and a functional unit consisting of actuating drive and actuating element on the other hand, the control unit contains, in addition to an ordinary pole-reversing and evaluation circuit, also a source of alternating voltage as well as means for connecting the alternating voltage and a decoder, and at least two passive components of different size which can be connected in the two-pole connection by the actuating element in parallel to the actuating drive are provided.

By these measures, the result is obtained that, aside from the two connecting lines which are necessary for supplying the actuating drives with current, no further lines are necessary. By means of the connected alternating voltage and the passive components which are connected in parallel to the actuating drive, signals are generated which make it possible clearly to distinguish between the actuating commands given. Thus, for instance, with a supply voltage of 5 V, the passive components can be so designed in arrangement with the actuating drive in such a manner that three different signals, spaced apart by about 1.7 V are obtained.

BRIEF DESCRIPTION OF THE DRAWING

With the above and other advantages in view, the present invention will become more clearly understood in connection with the detailed description of the preferred embodiments, when considered with the accompanying drawings of which.

DETAILED DESCRIPTION OF THE PREFERRED EMBODIMENT

Figure 1:
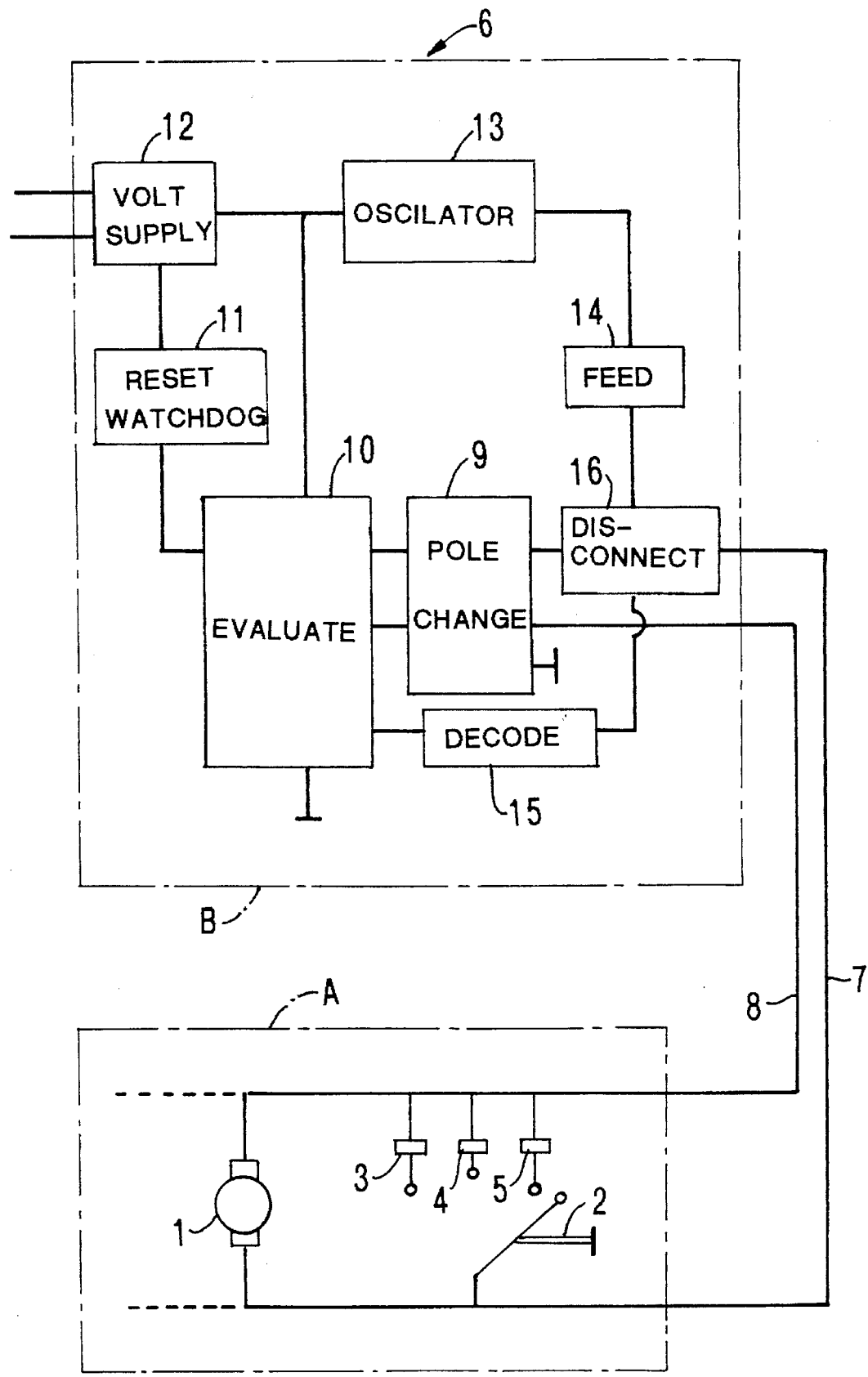
FIG. 1 shows a system for controlling actuators in doors of motor vehicles for operating a device such as a window, in accordance with a first embodiment of the invention.

In FIG. 1, the circuit comprises a first assembly A having an actuating drive in the form of a motorized actuator 1, an actuating element in the form of a switch 2 connecting with three different passive components 3, 4, 5, and an assembly B which includes a control unit 6 from which only two connecting lines 7 and 8 are laid to the actuating drive 1. The control unit 6 contains a pole-reversing circuit or pole changer 9 and an evaluating circuit 10 in the form of a microprocessor with data memory. Furthermore, as is customary, there is provided a reset and watchdog logic 11 and a voltage supply 12 which in automotive vehicles is generally set at 5 V dc.

In accordance with the invention, the control unit 6 has an oscillator 13 for producing an alternating voltage which can be fed via an element 14 into the connecting line 7, as well as a decoder 15 for evaluating the signals generated by alternating voltage and passive components 3, 4, 5 connected in series.

If the pole changer 9 is of such a nature that the actuating drives, such as the actuator 1, which are not used are short-circuited, an element 16 for disconnection of such actuators during the production of the signal must be provided.

The circuit shown can be supplemented by further actuating drives and actuating elements. Thus, for instance, for providing the central locking function, an actuator drive can be provided for each door lock, for the trunk door, and possibly also for the gas tank cover and the glove compartment, as well as one actuating element each for the right and left front doors.

The circuit can also be supplemented with corresponding actuating element for other groups of actuating elements (window, outside mirror). In this case, the pole charger 9 can be designated so that it can be switched to the different groups of actuating drives.

In accordance with FIG. 1, the invention concerns the electrical connection between the first assembly A and the second assembly B. In the first assembly A, the three passive components 3, 4, 5 differ in their electric values and can be connected in parallel to the actuator 1 by the driver of a car by means of the switch 2. The first assembly A is located in the door of the car and the second assembly B is located in the engine compartment of the car. The object of the invention is to employ only the two feed lines 7, 8 for the control of the actuator 1.

Figure 2:
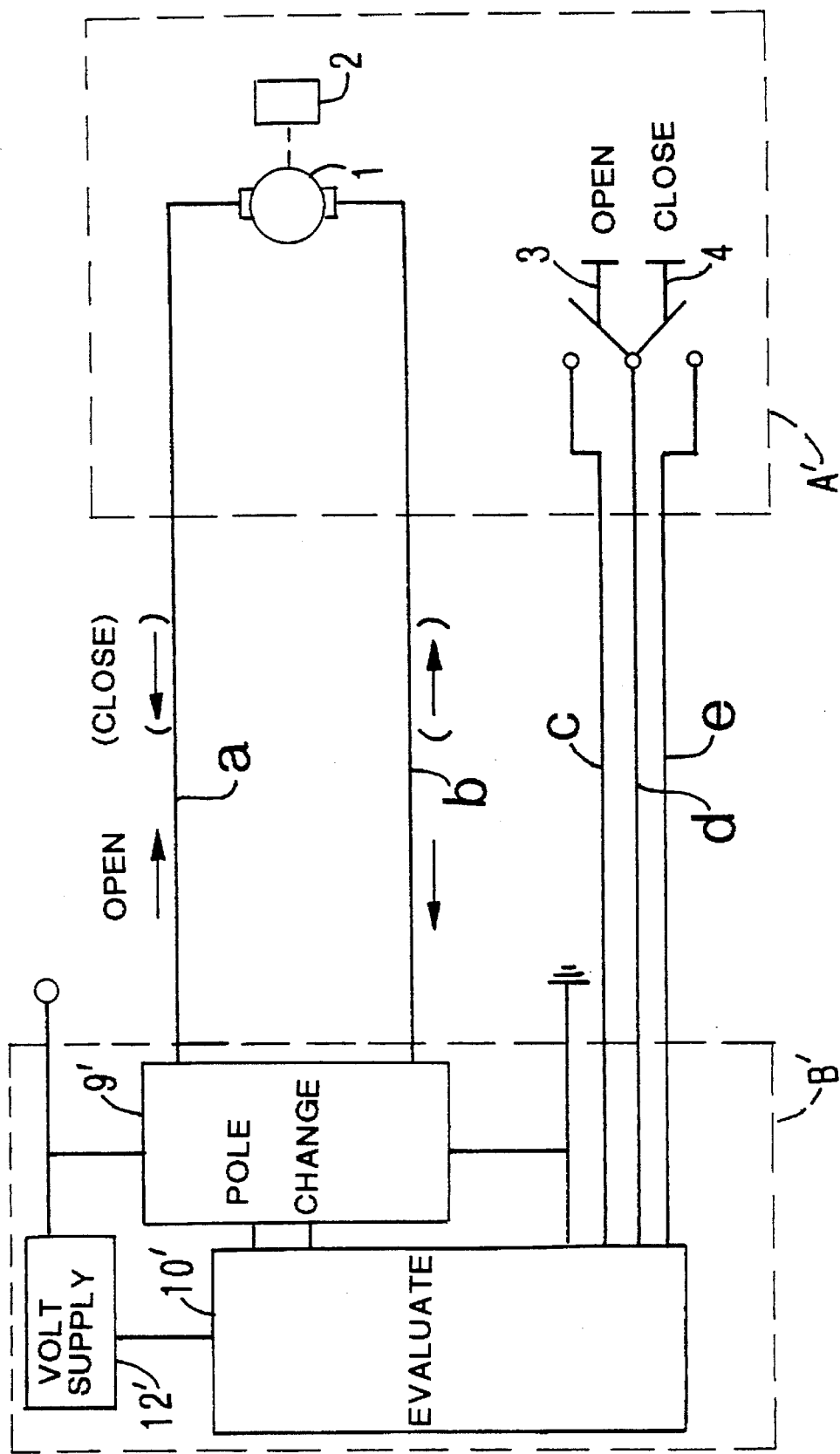
FIG. 2 shows a similar system of the prior art.

In accordance with the prior art, as shown in FIG. 2, three additional lines c, d, e are necessary in addition to the current supply for the actuator 1 and switch 2 (lines a, b) for the transmitting of two different commands from assembly A' to assembly B'. In it, the passive components 3 and 4 are two switches and/or a changeover key, for instance for the locking and unlocking of the door lock or for the opening and closing of a side window. An additional line would be necessary for each further function.

The commands generated in the assembly A' by the components 3, 4 are converted, in an evaluation circuit 10' in assembly B', which is fed with 5 volts d.c. via a voltage supply 12' from the 12 volt electrical system of the car, into control commands for a pole changer 9' which connects the motor of the actuator 1 with the electrical system of the car in accordance with the desired direction of rotation.

Figure 3:
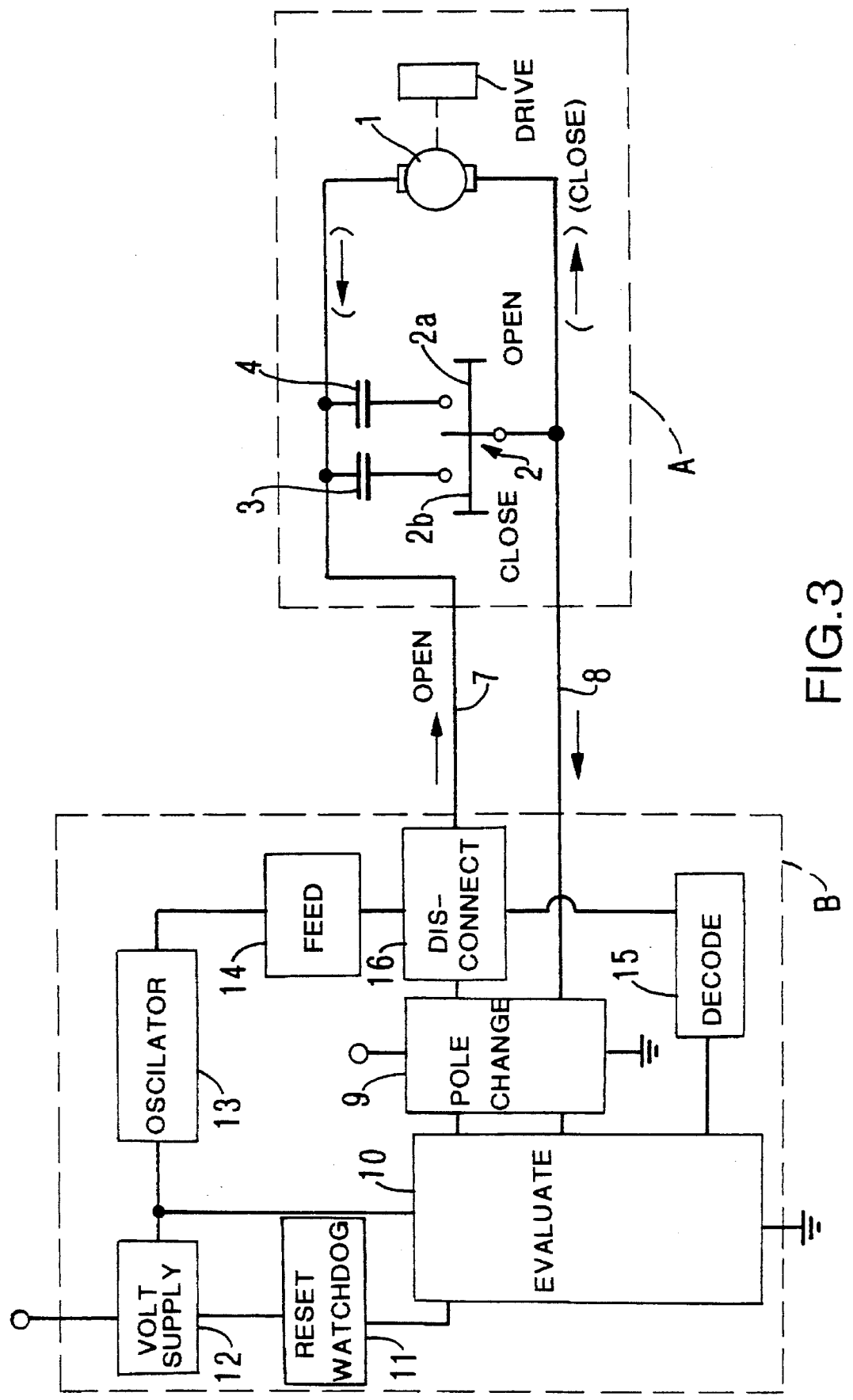
FIG. 3 shows the system of the invention in accordance with a second embodiment.

FIG. 3 corresponds essentially to FIG. 1, in that all switch elements in assembly B have the same functions as the elements designated by the same numbers in both FIGS. 1 and 3. Assembly A" of FIG. 3 differs somewhat from assembly A of FIG. 1. The two passive elements 3 and 4 are capacitors which can be switched in parallel to the actuator 1 via the switch (or key) 2, capacitances of the two capacitors being in a ratio of 1:10. The two positions of the switch 2 are designated as 2a and 2b. If an alternating voltage of 60 kHz (kilohertz) is introduced into the connecting lines 7, 8, a signal of 5 V, 3.2 V or 1.9 V can be obtained at the input of the evaluation circuit 10 coming from the decoder 15 depending on the positions 2a and 2b assumed by the switch 2. Corresponding to these different signals, the motor of the actuator 1, via the pole changer 9, is deactivated at 5 V, rotated clockwise with 3.2 volts, or rotated counterclockwise with 1.9 volts.

The two functions "open" and "close" of a window in the vehicle door are associated with these two directions of rotation, it being immaterial in principle which function is associated with which signal. The control of the motor is advisedly limited in time to, for instance, one second, and during the control of the motor, the alternating voltage is advisedly disconnected so that no false signals are processed in the evaluation circuit 10.

In a test circuit which was set up, motors having an ohmic resistance of 4.5 R and an inductance of 2.5 mH as well as two capacitors of 10 nF and 100 nF respectively were used (R=ohm, mH=microhenry, nF=nanofarad). With an alternating voltage of 60 kHz the motors have a resistance of 600 R. Under these conditions, the level at rest in neutral position of the switch was 5 V at the input of the evaluation circuit, 3.2 V upon the command "open", and 1.9 V upon the command "close".

Figure 4:
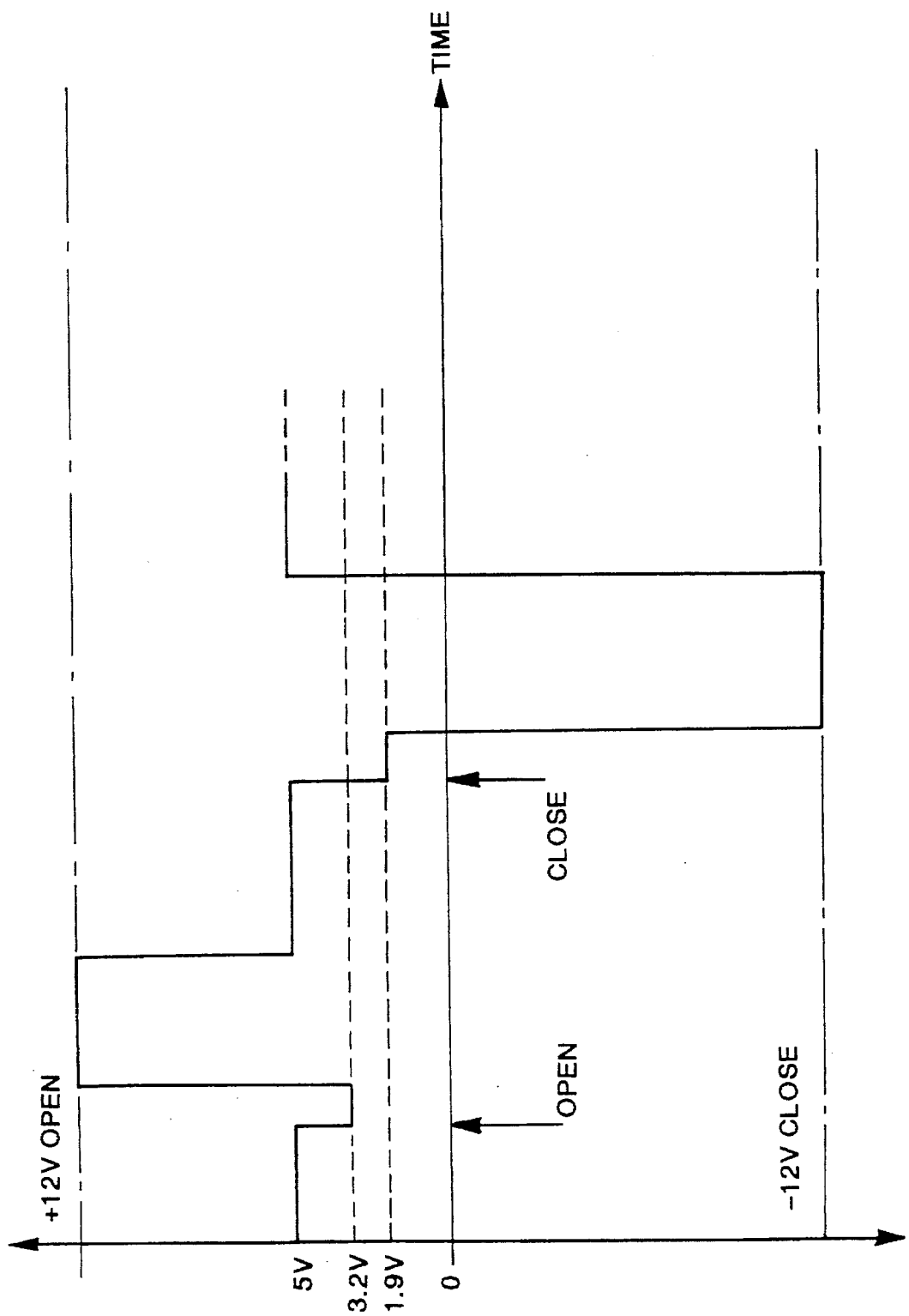
FIG. 4 is a timing diagram useful in explaining operation of the systems of FIGS. 1 and 3.

FIG. 4 shows an example of the variation with time of the motor control. At the start, the level is 5 V. If the command "open" is given via the switch 2, i.e. the capacitor 4 of 100 nF connected in parallel with the actuator motor, then the level drops to 3.2 V, as a result of which, after a short time, +12 V supply voltage is applied to the motor. After a predeterminable time of, for instance, 1 second, this voltage is again disconnected and the level of 5 V is again present, corresponding to the neutral position of the unactuated switch. If a "close" command is then given, the capacitor 3 of 10 nF is connected in parallel and the level of 1.9 V is present at the input of the evaluation circuit 10. Accordingly, the motor is controlled with −12 V and, after a second, automatically disconnects itself. The "neutral" level of 5 V is then again present.

By a suitable adaptation of the capacitors in combination with the actuators involved, other signal levels and other associations can also be produced. In particular, the total level of 5 V available can be further subdivided if more that two different commands and a neutral position must be "recognized".

What is claimed is:

1. A system for controlling actuating members in a door of a motor vehicle with the use of passive components to produce control commands, the system comprising:

a two-pole line, at least one electromotive actuating drive and at least one actuating element which are located in the door of the vehicle, and a control unit located in the vehicle distant from the door, the actuating element serving to direct a D.C voltage to the actuating drive;

wherein the actuating drive and the actuating element constitute a functional unit, and only the two-pole line is present to provide electrical connection between the control unit and the functional unit;

the control unit includes a source of alternating voltage and a source of direct voltage for supplying voltages to the two-pole line, a pole-reversing circuit connected with the two-pole line for reversing polarity of the D.C. voltage, an evaluation circuit, means for connecting the alternating voltage to the two-pole line, and a decoder for decoding signals appearing on the two-pole line, the decoder interconnecting the two-pole line with the evaluation circuit and being operative with the evaluation circuit for evaluating electrical signals appearing on the two-pole line;

the evaluation circuit connects with the pole-reversing circuit for selecting a polarity of the D.C. voltage; and the system includes at least two passive components of different impedances which are located in the vehicle door and are connectable into the two-pole line by the at least one actuating element in parallel to the actuating drive, a connection of an individual one of said passive components into the two pole line serving to provide a coded signal to the decoder upon excitation of the two pole line with the alternating voltage.

2. A system according to claim 1, further comprising a disconnecting member disposed between the pole-reversing circuit and the actuating drive.

3. A system according to claim 1, wherein the source of alternating voltage comprises an oscillator, and the control unit includes a controlled direct voltage supply for energizing the source of alternating voltage.

4. A system according to claim 1, wherein said evaluation circuit comprises a digital evaluation circuit with microprocessor and data storage operatively coupled to said microprocessor, and the system further comprises reset and watchdog logic connecting with the evaluation circuit.

5. A system according to claim 1, wherein the source of alternating voltage operates at a frequency within the range of 20 to 100 kHz.

6. A system according to claim 1, wherein said vehicle has a second door, and a second actuating drive located in said second door; and the pole-reversing circuit is switchable to different ones of said actuating drives in the doors of the motor vehicle.

7. A method of controlling an actuating member in a door of an automobile vehicle with the use of a device for controlling the actuating element by use of passive components to produce control commands, the device comprising:

a two-pole line, at least one electromotive actuating drive and at least one actuating element which are located in the door of the vehicle, and a control unit located in the vehicle distant from the door, the actuating element serving to direct a D.C. voltage to the actuating drive;

wherein the actuating drive and the actuating member constitute a functional unit, and only the two-pole line is present to provide electrical connection between the control unit and the functional unit;

the control unit includes a source of alternating voltage and a source of direct voltage for supplying voltages to the two-pole line, a pole-reversing connected with the two-pole line circuit for reversing polarity of the D.C. voltage, an evaluation circuit, means for connecting the alternating voltage to the two-pole line, and a decoder for decoding signals appearing on the two-pole line, the decoder interconnecting the two-pole line with the evaluation circuit and being operative with the evaluation circuit for evaluating electrical signals appearing on the two-pole line;

the evaluation circuit connects with the pole-reversing circuit for selecting polarity of the D.C. voltage; and the device includes at least two passive components of different impedances which are located in the vehicle door and are connectable into the two-pole line by the at least one actuating element in parallel to the actuating drive;

wherein the method comprises steps of:

applying an alternating voltage to the two-pole line;

connecting into the two-pole line one of the passive components by the one actuating element in parallel with the one actuating drive; and evaluating a resultant signal on the two-pole line for controlling the one actuator drive.

8. A method according to claim 7, wherein said connecting step is accomplished by intermittent operation of the alternating voltage.

* * * * *